US011347190B1

(12) United States Patent
Alsaggaf et al.

(10) Patent No.: US 11,347,190 B1
(45) Date of Patent: May 31, 2022

(54) METHOD FOR ROBUST LIQUID LEVEL CONTROL BASED ON ARTIFICIAL TIME-DELAY CONTROL USING IMC FEEDBACK

(71) Applicant: King Abdulaziz University, Jeddah (SA)

(72) Inventors: Abdulrahman U. Alsaggaf, Jeddah (SA); Ubaid M. Al-Saggaf, Jeddah (SA); Muhammad Moinuddin, Jeddah (SA); Asmaa Ubaid Alsaggaf, Jeddah (SA); Batoul Ahmad Alattas, Jeddah (SA); Arunava Banerjee, Delhi (IN); Mashuq-Un Nabi, Delhi (IN); Rajasree Sarkar, Delhi (IN)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/497,253

(22) Filed: Oct. 8, 2021

(51) Int. Cl.
| | | |
|---|---|---|
| *G05B 11/01* | (2006.01) | |
| *G05B 6/02* | (2006.01) | |
| *B65D 90/48* | (2006.01) | |
| *G01F 23/80* | (2022.01) | |

(52) U.S. Cl.
CPC .............. *G05B 11/01* (2013.01); *B65D 90/48* (2013.01); *G01F 23/806* (2022.01); *G05B 6/02* (2013.01)

(58) Field of Classification Search
CPC .......... G05B 11/01; G05B 6/02; B65D 90/48; G01F 23/806
USPC ....................................................... 700/281
See application file for complete search history.

(56) References Cited

U.S. PATENT DOCUMENTS

2016/0357162 A1    12/2016    He et al.

FOREIGN PATENT DOCUMENTS

| IN | 1964/CHE/2015 | 1/2015 |
| KR | 10-2011-0066262 | 6/2011 |

OTHER PUBLICATIONS

IEEE (An IMC-PI based Level Control with Gain Scheduling and Set Point Weighting), By: Rajasree Sarkar (Year: 2019).*
Controller Tuning Method for Non-Linear Conical Tank System, (Asian Journal of Applied Science and Technology (AJAST) vol. 1, Issue 2, pp. 224-228, Mar. 2017) By: Dr.G.Saravanakumar (Year: 2017).*
Zhang, et al. ; Friction Compensation Based on Time-Delay Control and Internal Model Control for a Gimbal System in Magnetically Suspended CMG; IEEE Transactions on Industrial Electronics ( vol. 64 , Issue: 5, May 2017) ; Abstract Only ; 1 Page.

* cited by examiner

*Primary Examiner* — Jigneshkumar C Patel
(74) *Attorney, Agent, or Firm* — Oblon, McClelland, Maier & Neustadt, L.L.P.

(57) ABSTRACT

A method and system for set point control of a liquid level in a conical tank is disclosed. The method includes receiving set point signal, R(s), summing the set point signal, R(s), with a negative feedback signal, df(s), and generating set point error signal, E(s), which is used as feedback at the input to drive the liquid level in the conical tank to a desired set point, thus controlling the liquid level of conical tank so that external disturbance, df(s), is minimized.

7 Claims, 11 Drawing Sheets

METHOD FOR ROBUST LIQUID LEVEL CONTROL BASED ON ARTIFICIAL TIME-DELAY CONTROL USING IMC FEEDBACK

STATEMENT OF ACKNOWLEDGEMENT

The inventors extend their appreciation to the Deputyship for Research and Innovation, Ministry of Education in Saudi Arabia for funding this research work through the project number 2020-088 and King Abdulaziz University, DSR, Jeddah, Saudi Arabia.

BACKGROUND

Technical Field

The present disclosure is directed to a method and a system for robust liquid level control based on artificial time-delay control using internal model control (IMC) feedback.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conical tanks are widely used in process industries due to their cone-shaped structure, which prevents solid waste accumulation and ensures smooth drainage in and out of the conical tanks. Conical tanks find wide applications in process industries, namely hydrometallurgical industries, food process industries, concrete mixing industries, and wastewater treatment industries.

The control of the liquid level in a conical tank is a challenging problem due to its non-linear shape, constantly varying cross-section, and external disturbances encountered during its operation. The problem of liquid level control for the conical tank has been researched extensively over the last several decades. Extensive research has resulted in the development of various control methodologies for liquid level control in conical tanks. However, the control methodologies that have been developed mostly require the knowledge of the upper bound of disturbance in order to control the liquid level of conical tanks in an efficient and robust manner. Additionally, these methodologies are also susceptible to the generation of high magnitude control inputs that may not be within hardware capability and may also drive the system towards instability.

Accordingly, it is one object of the present disclosure to provide methods and systems for robust liquid level control in conical tanks.

SUMMARY

In an exemplary embodiment, a liquid level control method for set point control of a liquid level in a conical tank is disclosed. The liquid level control method includes receiving a set point signal, R(s), summing the set point signal with a negative feedback signal, df(s), to generate a set point error signal, E(s), receiving, by a set point tracking controller, $G_{Cn}(s)$, the set point error signal, E(s), generating, by the set point tracking controller, $G_{Cn}(s)$, a set point process signal, U(s), applying the set point process signal, U(s), to a process, $G_{pr}(s)$, which drives the liquid level in the conical tank to a desired set point defined by the set point signal, R(s), the process, $G_{pr}(s)$, receiving an external disturbance, df(s) and generating a process output signal, Y(s), applying the set point process signal, U(s), to a processor configured to execute a process model, $\hat{G}_{pr}(s)$, where the process model generates a process model output, subtracting the process model output from the process output signal, Y(s), thus generating the negative feedback signal, df(s), and controlling the liquid level of the conical tank so that external disturbance, df(s) is minimized.

In another exemplary embodiment, a system for liquid level set point control is disclosed. The system includes a conical tank having an open end area $A=\pi R^2$, where R is a radius of the open end at an open end height, H, defined by a length from a point of a cone to the open end, wherein a liquid level set point signal, R(s), defines a set point height, h, of a liquid in the conical tank at a radius, r, and a set point area, $a=\pi r^2$, a valve, K, configured to control an inflow rate, $F_{ir}$, of liquid into the conical tank, a process, $G_{pr}(s)$, connected to the valve, K, the process $G_{pr}(s)$ configured to control the valve, K, to drive the liquid level in the conical tank to the set point height, h, and generate a process output signal, Y(s), an external disturbance, df(s), input to the process, $G_{pr}(s)$, a processor configured to execute a process model, $\hat{G}_{pr}(s)$ to generate a negative feedback signal, df(s), a set point tracking controller, $G_{Cn}(s)$, including circuitry and program instructions, which when executed by the processor, receive the set point signal, R(s), the process output signal, Y(s), and the negative feedback signal df(s), and generate a set point process signal, U(s), a feedback loop configured to connect the processor to receive the set point process signal, U(s), and provide the negative feedback signal, df(s), to the set point tracking controller, $G_{Cn}(s)$, where the set point tracking controller, $G_{Cn}(s)$, is configured to control the liquid level of the conical tank so that external disturbance, df(s) is minimized.

In another exemplary embodiment, a non-transitory computer readable medium having instructions stored therein that, when executed by one or more processors, cause the one or more processors to perform a liquid level control method for set point control of a liquid level in a conical tank. The liquid level control method includes receiving a set point signal, R(s), summing the set point signal with a negative feedback signal, df(s), to generate a set point error signal, E(s), receiving, by a set point tracking controller, $G_{Cn}(s)$, the set point error signal, E(s), generating, by the set point tracking controller, $G_{Cn}(s)$, a set point process signal, U(s), applying the set point process signal, U(s), to a process, $G_{pr}(s)$, which drives the liquid level in the conical tank to a desired set point defined by the set point signal, R(s), the process, $G_{pr}(s)$, receiving an external disturbance, df(s) and generating a process output signal, Y(s), applying the set point process signal, U(s), to a processor configured to execute a process model, $\hat{G}_{pr}(s)$, wherein the process model generates a process model output, subtracting the process model output from the process output signal, Y(s), thus generating the negative feedback signal, df(s), and controlling the liquid level of the conical tank so that external disturbance, df(s) is minimized.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
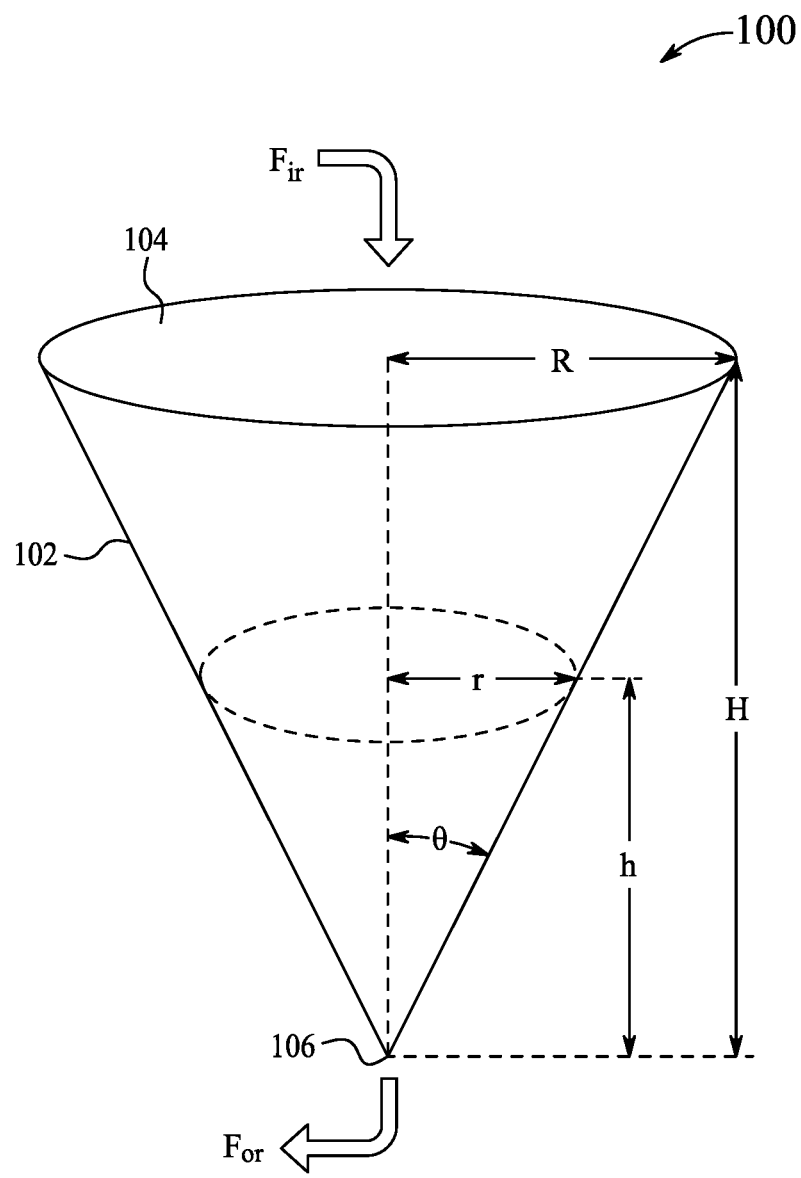
FIG. 1 illustrates a conical tank, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a method and a system for robust liquid level control based on artificial time-delay control using Internal Model Control (IMC) feedback.

FIG. 1 illustrates a structure of a conical tank system 100 to which is applied liquid level set point control.

Figure 3:
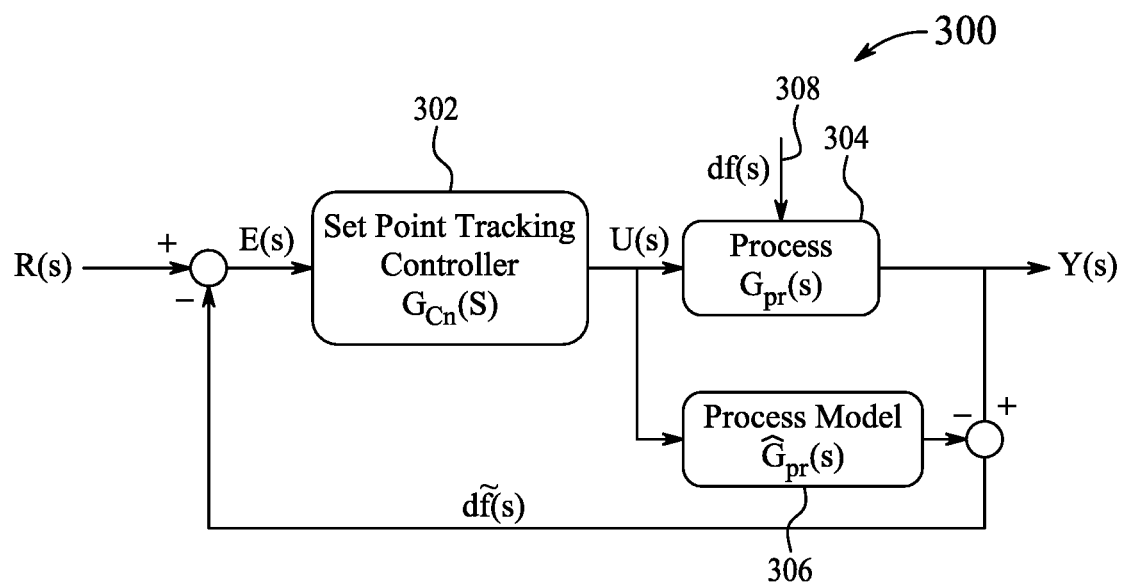
FIG. 3 is a block diagram of an IMC closed-loop circuit, according to certain embodiments.
Figure 4:
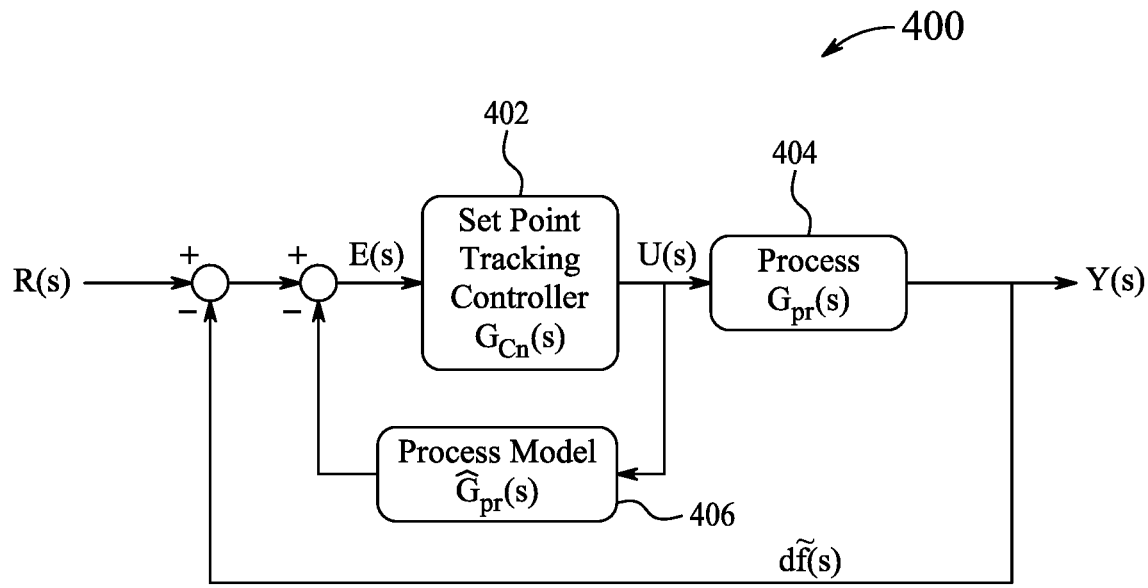
FIG. 4 is a modified block diagram of the IMC closed-loop circuit, according to certain embodiments.

According to an aspect, the conical tank system 100 may be a non-linear system. As shown in FIG. 1, the conical tank system 100 (interchangeably referred to as system 100) may include a conical tank 102. The conical tank 102 may have a cone-shaped structure. Further, the conical tank 102 may include a broad opening 104 and a narrow opening 106. The conical tank system 100 may also include a valve, a process, $G_{pr}(s)$, connected to the valve, a processor configured to execute a process model, $\hat{G}_{pr}(s)$, a set point tracking controller, $G_{Cn}(s)$, and a feedback loop configured to connect the processor as shown in FIG. 3 and FIG. 4.

In an example, a liquid enters the conical tank 102 through the broad opening 104 and exits through the narrow opening 106. Further, a maximum height of the conical tank 102 is represented as, H, and a maximum radius of the conical tank 102 is represented as, R. In an example, R is as a radius of an open end at an open end height H, and H is defined as a length from a point of a cone to the open end.

In an example, the level of a liquid in the conical tank 102 may be maintained at a constant rate (or a steady state) by controlling the inflow of the liquid in the conical tank 102. According to an aspect of the present disclosure, a liquid level set point signal, R(s), defines a set point height, h, of the level of the liquid in the conical tank 102 at a radius, r, and a set point area, $a=\pi r^2$. In an aspect, an opening angle of the conical tank 102 may be represented as, θ, which is given by equations (1) and (2), provided below.

$$\tan\frac{\theta}{2} = \frac{R}{H} = \frac{r}{h} \tag{1}$$

$$r = \frac{R}{H}h \tag{2}$$

A change in a cross sectional area (or an open end area) of the conical tank 102 may result in a time-varying flow rate of the liquid along a length of the conical tank 102. As described in FIG. 1, an inflow rate of the liquid into the conical tank 102 may be represented as, $F_{ir}$, and an outflow rate of the liquid may be represented as, $F_{or}$. A valve at $F_{ir}$ may control the inflow rate, $F_{ir}$. The cross sectional area of the conical tank 102 may be given by equation (3) provided below:

$$A = \pi R^2 \tag{3}$$

For the mass of liquid in the conical tank 102 being at a constant rate, the governing equation of liquid flow in the conical tank 102 may be derived using law of conservation of mass as shown below.

The amount of liquid accumulated in the conical tank 102=Liquid inflow rate ($F_{ir}$)−Liquid outflow rate ($F_{or}$).

The liquid flow in the conical tank 102 may be expressed using equation (4) provided below.

$$F_{ir} - F_{or} = A\frac{dh}{dt} \tag{4}$$

where, dh/dt is a variation in liquid level in the conical tank 102 with time (i.e., a change in height of the liquid per unit time).

An expression for the outflow rate, $F_{or}$, of the liquid may be provided using equation (5) and an expression of variation in liquid level in the conical tank 102 may be provided using equation (6).

$$F_{or} = K\sqrt{h}, \tag{5}$$

$$\frac{dh}{dt} = \frac{F_{ir} - K\sqrt{h}}{A}, \tag{6}$$

where, h is a height of the liquid level at the set point, A is a cross sectional area of the conical tank 102 at the set point, $F_{ir}$ is an inflow rate of the liquid into the conical tank 102, and K is a valve coefficient of a valve of the conical tank 102 which controls the inflow rate, $F_{ir}$, of the liquid into the conical tank 102.

Non-limiting model parameters considered in the analysis of the exemplary conical tank system are provided in Table 1.

TABLE 1

Parameter Values

| Variable | Description | Magnitude |
| --- | --- | --- |
| K | Valve Coefficient | 55 cm$^2$/sec |
| R | Maximum cross-sectional area | 19.25 cm |
| $F_{ir}$ | Inflow Rate | 770 cm$^3$/sec |
| H | Maximum height | 73 cm |

The conical tank system 100 may encounter external disturbances during its operation. Due to the non-linear nature of the conical tank system 100 and the external disturbances encountered by the conical tank system 100, the conical tank system 100 may suffer from a liquid level control problem.

According to an aspect of the present disclosure, an artificial time-delay based robust control approach (i.e., time delayed control (TDC) approach) is described which is capable of handling the external disturbances that the conical tank system 100 encounters and approximate unknown dynamics of the conical tank system 100 through a time-delayed estimation (TDE). The TDC approach includes a TDE part and a feedback control part. The feedback control may be designed using Internal Model Control (IMC). The proposed TDC-IMC approach or method is provided for robust control of the liquid level. A primary objective of the present disclosure is to derive a control law which may drive the level of liquid in the conical tank 102 to a desired set point which is given by:

$$(t) \rightarrow \text{Set point.} \quad (7)$$

According to an aspect, the liquid level dynamics of the conical tank 102 may be represented by equation (8) provided below.

$$\dot{h}(t) = -\frac{K\sqrt{h(t)}}{A} + \frac{F(t)}{A} + d; \quad (8)$$

where, d is the external disturbance encountered by the conical tank system 100.

The expression for the cross sectional area of the conical tank 102 that is provided by equation (3) may be substituted in the liquid level dynamics of the conical tank 102 provided by equation (8). In this case, the liquid level dynamics becomes:

$$\dot{h}(t) = -\frac{KH^2 h(t)^{-\frac{3}{2}}}{\pi R^2} + \frac{H^2 h(t)^{-2} F(t)}{\pi R^2} + d. \quad (9)$$

According to an aspect, equation (9) is represented as $$\dot{h}(t) = A(t) + B(t)F(t), \quad (10)$$

where, $$A(t) = -\frac{KH^2 h(t)^{-\frac{3}{2}}}{\pi R^2} + d \text{ and } B(t) = \frac{H^2 h(t)^{-2}}{\pi R^2}.$$

A saturated control input may be considered as:

$$sat(F) = \begin{cases} F & \text{for } F(t) > F \\ F(t) & \text{for } 0 \le F(t) \le F, \\ 0 & \text{for } F(t) < 0 \end{cases} \quad (11)$$

Using a scaled form, having a scaling factor as $\vartheta \in (0\ 1]$, the saturated control input is represented by equation (12).

$$sat(F) = \vartheta F, \text{ where } \vartheta = \begin{cases} \dfrac{F}{F(t)} & \text{for } F(t) > F \\ 1 & \text{for } 0 \le F(t) \le F. \\ -\dfrac{F}{F(t)} & \text{for } F(t) < 0 \end{cases} \quad (12)$$

For any real-time system, the magnitude of a control input is always bounded. Hence, the controller should be designed in such a way that the generated control input meets the bound constraints even if the system is subjected to undesirable uncertainties. The controller of the present disclosure uses a TDC methodology to derive a robust control law. TDC based controllers usually exhibit high transient error in the initial phase which subsequently may generate a control input beyond the admissible bound. On the other hand, the TDC controller of the present disclosure strictly limits the control input within the feasible bounds, which is achieved by considering the input saturation in the design phase of the control law.

An error in the liquid level at any instant may be expressed as the difference between a current value of the liquid level, h(t), and a desired value of the liquid level, $h_r(t)$. In an aspect of the present disclosure, the error in the liquid level at any instant may be expressed using:

$$\tilde{h}(t) = h(t) - h_r(t). \quad (13)$$

Equation (13) may be differentiated with respect to time to obtain the error dynamics given by equation (14).

$$\dot{\tilde{h}}(t) = \dot{h}(t) - \dot{h}_r(t). \quad (14)$$

The liquid level dynamics of the conical tank 102 provided by equation (10) may be substituted in equation (14) to obtain the error dynamics given by:

$$\dot{\tilde{h}}(t) = A(h(t)) + \vartheta(t)B(h(t))F(t) - \dot{h}r(t). \quad (15)$$

For the ease of representation, all functions henceforth may be represented as a function of time (t) only.

According to an aspect, the above equation (15) may also be represented as:

$$\dot{\tilde{h}}(t) = D(t)\dot{h}(t) + \vartheta(t)B(t)F(t), \quad (16)$$

where, $D = A(t) - \dot{h}_r(t)$ When both sides of the equation (16) are divided by B(t), equation (16) becomes:

$$M(t)\dot{\tilde{h}}(t) = X(t) + \vartheta(t)F(t), \quad (17)$$

where, $M(t) = B(t)^{-1}$ and $X(t) = M(t)D(t)$.

When the equation (17) is added and subtracted by $\overline{M}(t)$, equation (17) becomes:

$$\overline{M}(t)\ddot{h}(t)=(\overline{M}(t)-M(t))\ddot{h}(t)+M(t)D(t)+\vartheta(t)F(t), \quad (18)$$

where, $\overline{M}(t)$ is designed in such a way that it ensures boundedness of an estimation error.

According to an aspect, equation (18) may alternately be expressed as:

$$\overline{M}(t)\ddot{h}(t)=\overline{X}(t)+\vartheta(t)F(t), \quad (19)$$

where, $\overline{X}(t)=(\overline{M}(t)-M(t))\ddot{h}(t)+M(t)D(t)$.

In an aspect of the present disclosure, X(t) may be calculated from input-output measurements and may be used for deriving the stabilizing control law for equation (17). However, the input-output measurements may be susceptible to external disturbances. According to an aspect, the TDC-IMC method may be employed for estimating the unknown dynamics of the conical tank system 100 and for generating an efficient response.

The manner in which the feedback control part of the TDC law is designed using IMC is described below. The feedback control part may interchangeably be referred to as a set point tracking controller. According to an aspect, the set point tracking controller may include circuitry and program instructions.

Figure 2:
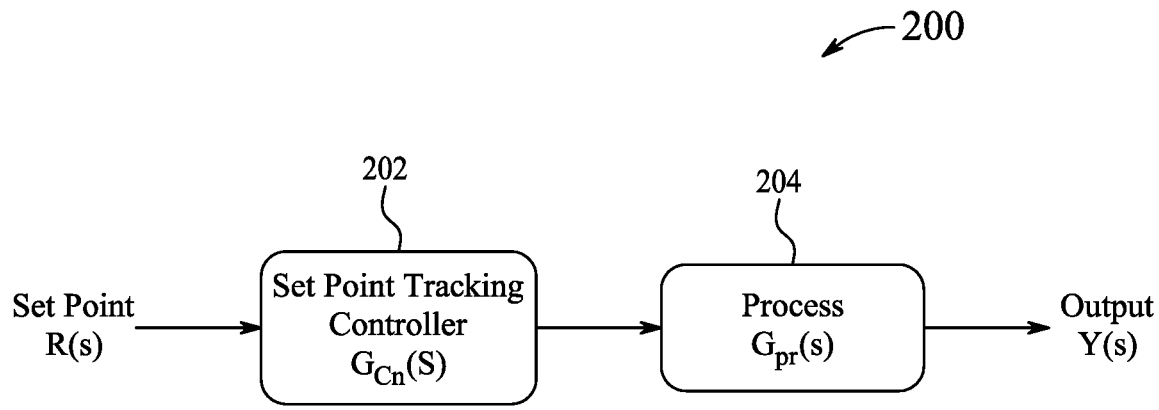
FIG. 2 is a block diagram of an Internal Model Control (IMC) open-loop circuit, according to certain embodiments.

FIG. 2 is a block diagram 200 of an IMC open-loop circuit, according to aspects of the present disclosure.

As shown in FIG. 2, a set point tracking controller, $G_{Cn}(s)$, 202 is designed such that the set point tracking controller, $G_{Cn}(s)$, 202 is an inverse of a process, $G_{pr}(s)$, 204 as described in equation (20) provided below:

$$G_{cn}(s)=G_{pr}^{-1}(s). \quad (20)$$

In operation, a set point signal, R(s), is input to the set point tracking controller, $G_{Cn}(s)$, 202. The process, $G_{pr}(s)$, 204 and the set point tracking controller, $G_{Cn}(s)$, 202 may process the set point signal, R(s), to generate a process output signal, Y(s). As obtaining an exact inverse of $G_{pr}(s)$ may not be simple for real-time practical systems, the set point tracking controller, $G_{Cn}(s)$, 202, the design may pose significant challenges. Additionally, the effect of external disturbances also plays a key role in making the effective design of the set point tracking controller, $G_{Cn}(s)$, 202, a challenge. To overcome these challenges with respect to the set point tracking controller, $G_{Cn}(s)$, 202, an IMC closed-loop circuit is proposed. The IMC closed-loop circuit is explained in FIG. 3.

FIG. 3 is a block diagram 300 of an IMC closed-loop circuit, according to aspects of the present disclosure.

In operation, a set point signal, R(s), is received and summed with a negative feedback signal, $d\tilde{f}(s)$, to generate a set point error signal, E(s). The set point error signal, E(s), is input to a set point tracking controller, $G_{Cn}(s)$, 302. The set point tracking controller, $G_{Cn}(s)$, 302, may process the set point error signal, E(s), to generate a set point process signal, U(s). The set point process signal, U(s), is then applied to a process, $G_{pr}(s)$, 304, which drives the liquid level in the conical tank 102 to a desired set point defined by the set point signal, R(s). In an aspect, the process, $G_{pr}(s)$ 304 may receive an external disturbance, df(s), 308 and generate a process output signal, Y(s), based on the set point process signal, U(s), and the external disturbance, df(s), 308.

The set point process signal, U(s), is also applied to a process model, $\hat{G}_{pr}(s)$, 306 based on which the process model, $\hat{G}_{pr}(s)$, 306 generates a process model output. The process model output may be subtracted from the process output signal, Y(s), thus generating the negative feedback signal, $d\tilde{f}(s)$.

According to an aspect, the IMC open-loop circuit path may use the error-signal feedback, obtained by computing the difference between the actual model (i.e., the process $G_{pr}(s)$, 304) and the predicted model (i.e., a process model $\hat{G}_{pr}(s)$, 306) as $G_{pr}(s)-\hat{G}_{pr}(s)$, to effectively track the setpoint. In an aspect, the predicted model may closely mimic the actual model. As shown in FIG. 3, the set point process signal, U(s), is input to the process $G_{pr}(s)$, 304, and the process model $\hat{G}_{pr}(s)$, 306. The error between the process $G_{pr}(s)$, 304 and the process model $\hat{G}_{pr}(s)$, 306, is given as:

$$d\tilde{f}(s)=[G(s)-\hat{G}(s)]U(s)+df(s), \quad (21)$$

where, df(s)≠0 stands for any external disturbance effecting the process dynamics.

In order to achieve the desired regulation, the difference that exists between the set point signal, R(s), and negative feedback signal, $d\tilde{f}(s)$, is fed back to the process $G_{pr}(s)$, 304. Accordingly, the set point process signal, U(s), may be calculated based on equation (22) and the process output signal, Y(s), may be calculated based on equation (23).

$$U(s) = [R(s) - d\tilde{f}(s)]; = [R(s) - (G_{pr}(s) - \hat{G}_{pr}(s))]U(s) - \quad (22)$$

$$df(s)G_{Cn}(s); = \frac{(R(s) - df(s))G_{Cn}(s)}{1 + (G_{pr}(s) - \hat{G}_{pr}(s))G_{Cn}(s)},$$

where, $\hat{G}_{pr}(s)$ represents a vector of the process, $G_{pr}(s)$.

$$Y(s) = G_{pr}(s)U(s) + \quad (23)$$

$$df(s); = \frac{G_{Cn}(s)G_{pr}(s)R(s) + (1 - G_{Cn}(s)\hat{G}_{pr}(s))df(s)}{1 + (G_{pr}(s) - \hat{G}_{pr}(s))G_{Cn}(s)},$$

According to an aspect of the present disclosure, a transfer function of the set point tracking controller, $G_{Cn}(s)$, 302, is designed to approximate the inverse of the process, $G_{pr}(s)$ 304. The process model $\hat{G}_{pr}(s)$, 306 is factorized into an invertible part, $G_{pr}^{+}(s)$, and a non-invertible part, $G_{pr}^{-}(s)$. Further, an output of the process model $\hat{G}_{pr}(s)$, 306, (interchangeably referred to as the process model output) is generated based on the invertible part, $G_{pr}^{+}(s)$, as:

$$\hat{G}_{pr}(s)=\hat{G}_{pr}^{+}(s)\hat{G}_{pr}^{-}(s). \quad (24)$$

The set point error signal, E(s), may be low pass filtered by a low pass filter, $G_f(s)$, and such that the transfer function of the set point tracking controller, $G_{Cn}(s)$, 302, is given by:

$$G_{Cn}(s)=\hat{G}_{pr}^{+}(s)^{-1}G_f(s), \quad (25)$$

where, the filter transfer function is represented as $G_f(s)$.

According to aspects of the present disclosure, the block diagram 300 of FIG. 3 may be transformed into a block diagram as shown in FIG. 4.

FIG. 4 is a modified block diagram 400 of the IMC closed-loop circuit having a set point tracking controller, $G_{Cn}(s)$, 402, according to aspects of the present disclosure.

A process, $G_{pr}(s)$, 404 may be connected to the valve, K, and the process $G_{pr}(s)$, 404, may be configured to control the valve, K, to drive the liquid level in the conical tank 102 to the set point height, h. Further, an external disturbance, df(s), may be input to the process, $G_{pr}(s)$, 404. The process, $G_{pr}(s)$, 404 may generate a process output signal, Y(s) based on the external disturbance, df(s). A process model, $\hat{G}_{pr}(s)$, 406 may be executed to generate a negative feedback signal, $\widetilde{df}(s)$.

In an aspect, the set point tracking controller, $G_{Cn}(s)$, 402, may receive a set point signal, R(s), the process output signal, Y(s), and the negative feedback signal $\widetilde{df}(s)$, and generate a set point process signal, U(s). Further, as shown in FIG. 4, there is a feedback loop configured to provide the negative feedback signal, $\widetilde{df}(s)$, to the set point tracking controller, $G_{Cn}(s)$, 402. According to aspects of the present disclosure, the set point tracking controller, $G_{Cn}(s)$, 402 may be configured to control the liquid level of the conical tank 102 so that the external disturbance, df(s), is minimized.

Figure 5:
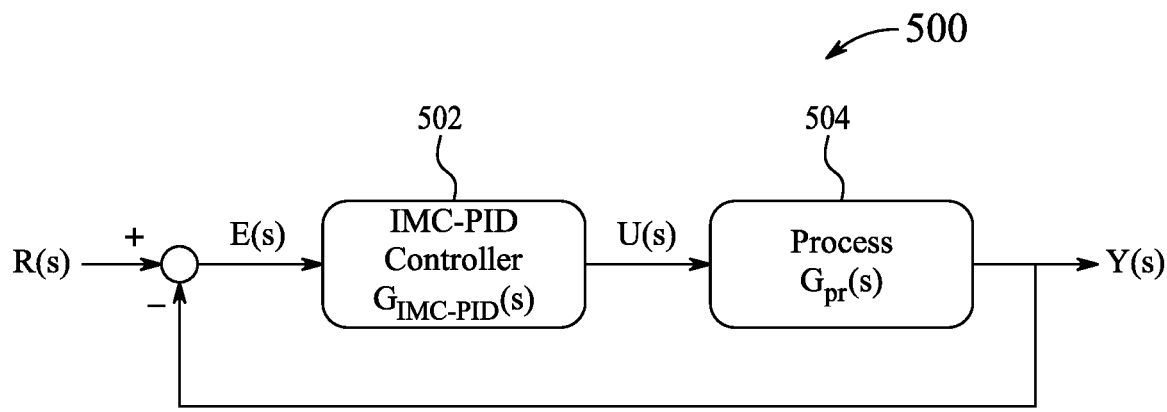
FIG. 5 is a simplified block diagram of the IMC closed-loop circuit, according to certain embodiments.

According to some aspects of the present disclosure, the circuit of FIG. 4 may further be simplified in order to arrive at a single controller. The controller may be in series with a process $G_{pr}(s)$, in a forward path, which is described in FIG. 5. The single controller may be referred to as IMC-PID controller and the transfer function of the IMC-PID controller may be computed based on equation (26).

$$G_{IMC-PID}(s) = \frac{G_{Cn}(s)}{1 - G_{Cn}(s)\hat{G}_{pr}(s)} = \frac{G_{pr}^+(s)^{-1} G_f(s)}{1 - G_{pr}^+(s)^{-1} G_f(s)\hat{G}_{pr}(s)}. \tag{26}$$

According to aspects of the present disclosure, the low pass filter, $G_f(s)$ is a first order low pass filter given by:

$$G_f(s) = \frac{1}{1 + T_f s}, \tag{27}$$

where $T_f(s)$ is a filter time constant.

In an aspect, the filter time constant, $T_f(s)$, may be set equal to a time constant of an open loop defined by the IM-PID controller, $G_{IMC-PID}(s)$, 502 (i.e., set point tracking controller, $G_{Cn}(s)$) and the process, $G_{pr}(s)$, 504.

As the liquid level is a fast process, incorporating derivative action leads to amplification of noise. Therefore, the IMC-controller, $G_{IMC-PID}(s)$, 502, is designed by setting $\hat{G}_{pr}^+(s)^{-1} = \overline{B}(s)s$ and substituting the equation (27) in the equation (26).

$$G_{IMC-PID}(S) = K_P \tag{28}$$

where, $K_p$ denotes the proportional gain and is computed as:

$$K_P = \frac{1}{BT_f}.$$

Figure 6:
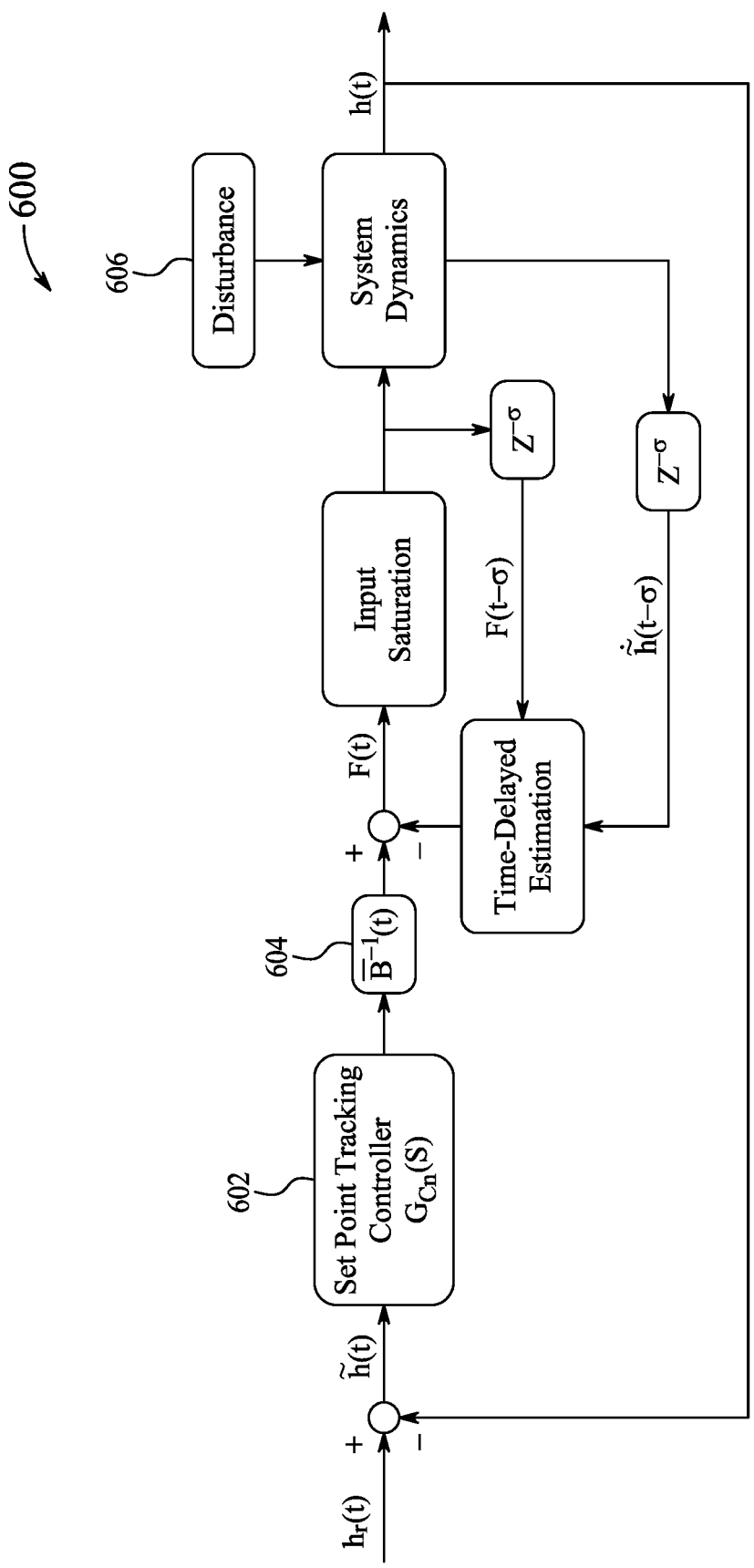
FIG. 6 is a schematic block diagram of a time delayed control (TDC)-IMC control method, according to certain embodiments.

FIG. 6 is a block diagram 600 of TDC-IMC control method, according to aspects of the present disclosure. According to an aspect, the steps involved in generation of a control signal for the conical tank system 100 using the proposed TDC-IMC control method are described in FIG. 6.

As shown in FIG. 6, an amplifier, $\overline{B}^{-1}(t)$, 604, is connected to an output of a set point tracking controller, $G_{Cn}(s)$, 602. A gain of the amplifier, $\overline{B}^{-1}(t)$, 604, is given by:

$$\overline{B}^{-1}(t) = \frac{\pi R^2}{H^2 H^2 h(t)^{-2}}. \tag{29}$$

According to aspects of the present disclosure, to construct the desired control for the conical tank system 100, a stabilizing control is designed as:

$$F(t) = \overline{M}(t)u(t) - \hat{X}(t). \tag{30}$$

where, the feedback control law obtained utilizing the principles of Internal Model-Control is given as:

$$u(t) = -K_P \tilde{h}(t). \tag{31}$$

By substituting the equation (30) and the equation (31), the liquid level dynamics yields the closed loop system as:

$$\overline{M}(t-\sigma)\dot{\tilde{h}}(t) = \vartheta(t-\sigma)\overline{M}(t-\sigma)u(t) + (\overline{X}(t) - \hat{X}(t)). \tag{32}$$

The equation (32) may also be represented as:

$$\dot{\tilde{h}}(t) = \vartheta(t)u(t) + \xi(t). \tag{33}$$

where, the estimation error for the closed loop system is given by $\xi = \overline{B}(t)[\overline{X}(t) - \hat{X}(t)]$. The estimation error $\xi$ is bounded in order for the closed loop system to be bounded. Based on the time-delay estimation, boundedness of the closed loop system can be ensured under the consideration that any uncertainties affecting the system are slow, varying in time. A time-delay logic estimates these uncertainties affecting the system dynamics at a present instant through a previous instant's input-output measurements as:

$$\hat{X}(t) \approx \overline{X}(t-\sigma) = \overline{M}(t-\sigma)\dot{\tilde{h}}(t-\sigma) - \vartheta(t-\sigma)F(t-\sigma), \tag{34}$$

where, by utilizing time-delay logic, the time-delayed estimate of $\overline{X}(t)$ is denoted by $\hat{X}(t)$.

According to an aspect of the present disclosure, by the application of the time-delay logic, an artificial delay that was not inherently present in the original error system is introduced into the system as:

$$\overline{M}(t-\sigma)\dot{\tilde{h}}(t) = \overline{M}(t-\sigma)\dot{\tilde{h}}(t-\sigma) - \vartheta(t-\sigma)F(t-\sigma) + \vartheta(t)F(t), \tag{35}$$

where, for an inherently delay-free system, a small delay introduced artificially is represented as σ.

According to aspects of the present disclosure, a fitting delay choice is σ=0, giving an exact estimation of the unknown part of the dynamics. In an aspect, measurements from an immediate previous time instant may be utilized for estimating the uncertainties. Considering a sufficiently small difference between the previous time instant and the current time instant would result in efficient estimation, for the current time instant t, the overall control law is derived based on the TDE part and the feedback control law u(t), as $$F(t) = \overline{M}(t)u(t) - \overline{M}(t-\sigma)\dot{\tilde{h}}(t-\sigma) + \vartheta(t-\sigma)F(t-\sigma). \tag{36}$$

According to an aspect, if the condition of choosing $\overline{M}(t)$ satisfies the condition $0 < \overline{M}(t) < M(t)$, then the estimation error $\xi$ (or the TDE error $\xi$) in equation (33) may remain bounded.

In an aspect, from equation (33), the estimation error $\xi$ for any instant of time may be expressed as:

$$\xi(t) = \dot{\tilde{h}}(t) - \vartheta(t)u(t). \tag{37}$$

Substituting $\xi(t-\sigma)$ F(t-σ) from equation (17) in delayed time into equation (36) results in:

$$F(t) = \overline{M}(t)u(t) - [\overline{M}(t) - M(t)]\dot{\tilde{h}}(t-\sigma) - X(t-\sigma). \tag{38}$$

Multiplying both sides of equation (37) with M(t) results in:

$$M(t)\xi(t) = M(t)\dot{\tilde{h}}(t) - \xi(t)M(t)u(t). \tag{39}$$

Further, substituting equation (38) in equation (39) results in:

$$M(t)\dot{\xi}(t)=X(t)+\vartheta(t)F(t)-\vartheta(t)M(t)u(t). \tag{40}$$

Using equation (38) in equation (40) results in:

$$M(t)\dot{\xi}(t)=X(t)-\vartheta(t)X(t-\sigma)+\xi(t)[\overline{M}(t)-M(t)]u(t)-\vartheta(t)$$
$$\overline{M}(t-\sigma)\dot{h}(t-\sigma)+\vartheta(t)M(t-\sigma)\dot{h}(t-\sigma). \tag{41}$$

Rearranging then adding and subtracting $\vartheta(t)\vartheta(t-\sigma)[\overline{M}(t-\sigma)-M(t)]u(t-\sigma)$ on the right hand side of the equation (41) results in, $$M(t)\dot{\vartheta}(t)=\vartheta(t)[$$
$$\overline{M}(t)-M(t)][u(t)\vartheta(t-\sigma)u(t-\sigma)]-\vartheta[M(t-\sigma)-M(t-\sigma)$$
$$\dot{h}(t-\sigma)+[X(t)-\vartheta(t)X(t-\sigma)]+\vartheta(t)\vartheta(t-\sigma)[$$
$$\overline{M}(t)-M(t)]u(t-\sigma). \tag{42}$$

Substituting (37) in (42) and rearranging the terms results in:

$$M(t)\dot{\xi}(t)=\vartheta(t)[M(t)-$$
$$\overline{M}(t)]\xi(t-\sigma)+[X(t)-\vartheta(t)X(t-\sigma)]+\vartheta(t)[$$
$$\overline{M}(t)-M(t)][u(t)-\vartheta(t-\sigma)u(t-\sigma)]. \tag{43}$$

According to an aspect of the present disclosure, a fixed sampling time digital computer may be used for hardware implementation of a control law. However, during such an implementation, the input-output data needed for the implementation of the control law is available only at the prior sampling instant. This results in the artificial time delay considered in for the TDE to be equal to the sampling time of the processor. Thus, in the discrete time form the current t and the delayed time (t−σ) instances can be expressed as $k^{th}$ and the $(k-1)^{th}$ instant, respectively. By using this representation, the TDE error system defined in equation (43) may be represented as:

$$M(k)\dot{\xi}(k)=\vartheta(k)[M(k)-$$
$$\overline{M}(k)]\xi(k-1)+[X(k)-\vartheta(k)X(k-1)]+\vartheta(k)[$$
$$\overline{M}(k)-M(k)][u(k)-\vartheta(k-1)u(k-1)]; \tag{44}$$

$$\Rightarrow\dot{\xi}(k)=\vartheta(k)[1-M(k)^{-1}$$
$$\overline{M}(k)]\xi(k-1)+M(k)^{-1}[X(k)-\vartheta(k)X(k-1)]-\vartheta(k)[1-M(k)^{-1}$$
$$\overline{M}(k)][u(k)-\vartheta(k-1)u(k-1)];$$

$$\Rightarrow\xi(k)=\vartheta(k)[1-M(k)^{-1}\overline{M}(k)]\xi(k-1)-\vartheta(k)[1-M(k)^{-1}$$
$$\overline{M}(k)]\rho_1(k-1)+\rho_2(k-1); \tag{45}$$

where, $\rho_1(k-1)=u(k)-\vartheta(k-1)u(k-1)$ and $\rho_2(k-1)=M(k)^{-1}[X(k)-\vartheta(k)X(k-1)]$.

In an aspect of the present disclosure, $\rho_1(k-1)$ being a function of control input always remains bounded and $\rho_2(k-1)$ is ensured to be bounded through the assumption of slowly varying uncertainties. As a consequence, the discrete time system governed by equation (45) remains stable if the state matrix of the system has its norm to be less than 1. Accordingly, the estimation error $\xi(t)$ is assured to remain bounded if the following condition holds.

$$|1-M(k)^{-1}\overline{M}(k)|<1 \; \forall k\in Z^+ \tag{46}$$

The condition in equation (46) ensures the boundedness of the TDE error and also shows that a choice of $\overline{M}(k)$ lesser than $M(t)$ would allow the formation of the proposed robust control law.

According to aspects of the present disclosure, by applying the control law provided by equation (36), the system defined in equation (15) remains uniformly ultimately bounded (UUB).

A Lyapunov function candidate is considered as:

$$V=\frac{1}{2}\tilde{h}^2. \tag{47}$$

Differentiating the Lyapunov function candidate in the equation (47) results in:

$$\dot{V}=\tilde{h}\dot{\tilde{h}}. \tag{48}$$

Further, substituting $\dot{\tilde{h}}$ in equation (33) results in:

$$\dot{V}=\tilde{h}[-K_p\tilde{h}(t)+\xi(t)], \tag{49}$$

$$\Rightarrow \dot{V}=-K_p\tilde{h}^2+\tilde{h}\xi. \tag{50}$$

Taking norm or maximum possible values for terms in the right hand side results in:

$$\dot{V}\leq-K_p\|\tilde{h}\|^2+\|\tilde{h}\|\|\xi\|. \tag{51}$$

In an aspect, in order to make the right hand side of equation (51) negative definite, the condition that needs to be followed is given as:

$$\|\tilde{h}\| > \frac{\|\tilde{h}(t)\|}{K_p}. \tag{52}$$

Therefore, the UUB stability of the closed loop system is affirmed which states that whenever the same is outside the stability bound expressed by right hand side of equation (52), the system states exponentially converge to the bound and remains therein.

EXAMPLES AND EXPERIMENTS

The following examples are provided to illustrate further and to facilitate the understanding of the present disclosure.

Experimental Data and Analysis

The TDC-IMC control method may facilitate in the regulation of the liquid level in the conical tank 102 in such a manner that it tracks the set point efficiently. The liquid level in the conical tank 102 may be required to remain constant and only change as and when the set point is updated. An efficient control law may enable to respond quickly to the changes in the set point while also tackling the various external disturbances that affect the liquid flow rate and may result in changes in the level of the liquid. The various parameter values used for designing the set point tracking controller are summarized in Table 2.

TABLE 2

Parameter Values for the set point tracking controller

| Parameter | $K_p$ | σ |
|---|---|---|
| Value | 2 | 0.1 |

According to an aspect, the external disturbance, d, may include a constant term along with two periodic components and a random number that mimics white noise. The expression for the considered external disturbance, d, is given as:

$$d = 0.05\left\{1 + \sin\left[\frac{\pi t}{250}\right] + \cos\left[\frac{\pi t}{250}\right] + 10^{-3}M_n\right\} \tag{53}$$

Further, a comparison has been carried out between the TDC-IMC control method, IMC based proportional integral controller (hereinafter referred to as IMC control method), and IMC based proportional integral controller with set point weighting (IMC-SPW) control method. The efficiencies of the compared methodologies are tested with respect to set point tracking. Initially at t=0 seconds, the set point is set at 35 cm and is changed at t=200 cm. At t=200 cm, the set point is set at 50 cm. The set point is again changed at t=450 sec. At t=450 sec, the set point is set at 60 cm.

Figure 7:
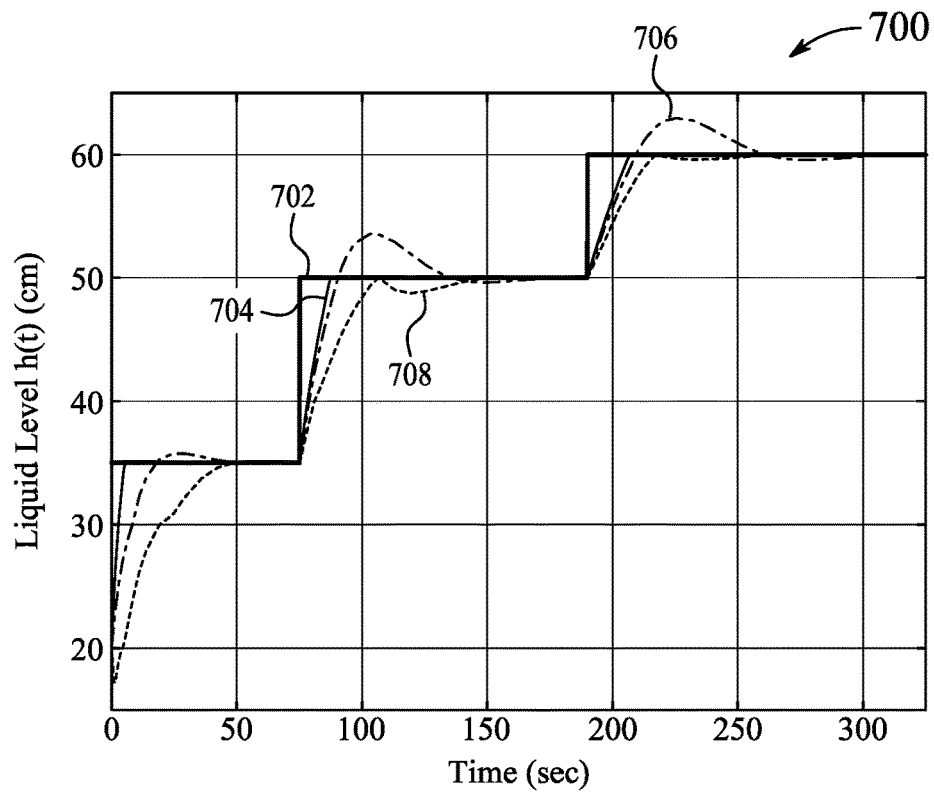
FIG. 7 is a plot illustrating a liquid level control performance of the TDC-IMC control method in comparison to conventional control methodologies, according to certain embodiments.

FIG. 7 is a plot 700 illustrating a liquid level control performance of the TDC-IMC control method in comparison to conventional control methodologies, according to aspects of the present disclosure. Plot line 702 illustrates a set point, plot line 704 illustrates a performance of the proposed TDC-IMC control method, plot line 706 illustrates a performance of the conventional IMC control method, and plot line 708 illustrates a performance of the conventional IMC-SPW control method. As described in FIG. 7, for a change in the set point, the proposed TDC-IMC control method enables the conical tank system 100 to track the revised set point efficiently.

Figure 8:
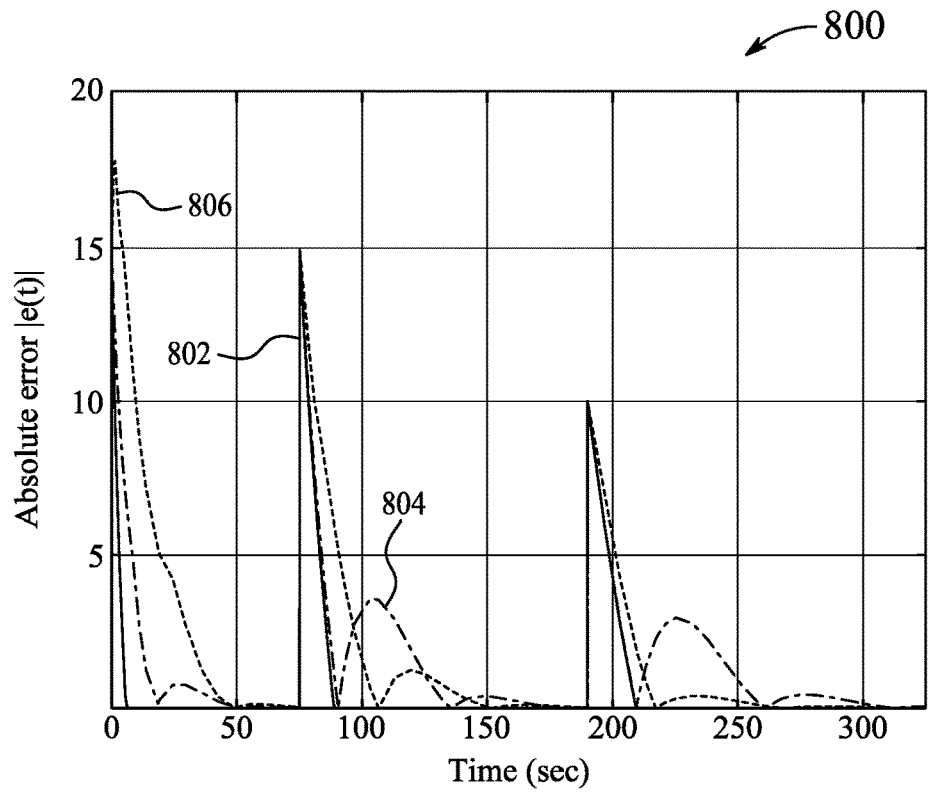
FIG. 8 is a plot illustrating an absolute error for the TDC-IMC control method in comparison to the conventional control methodologies, according to certain embodiments.

FIG. 8 is a plot 800 illustrating an absolute error for the TDC-IMC control method in comparison to the conventional control methods. In FIG. 8, plot line 802 illustrates an absolute error for the proposed TDC-IMC control method, plot line 804 illustrates an absolute error for the conventional IMC control method, and plot line 806 illustrates an absolute error for the conventional IMC-SPW control method. As can be seen in FIG. 8, the absolute error is minimum for the proposed TDC-IMC control method in comparison to the conventional control methodologies.

Figure 9:
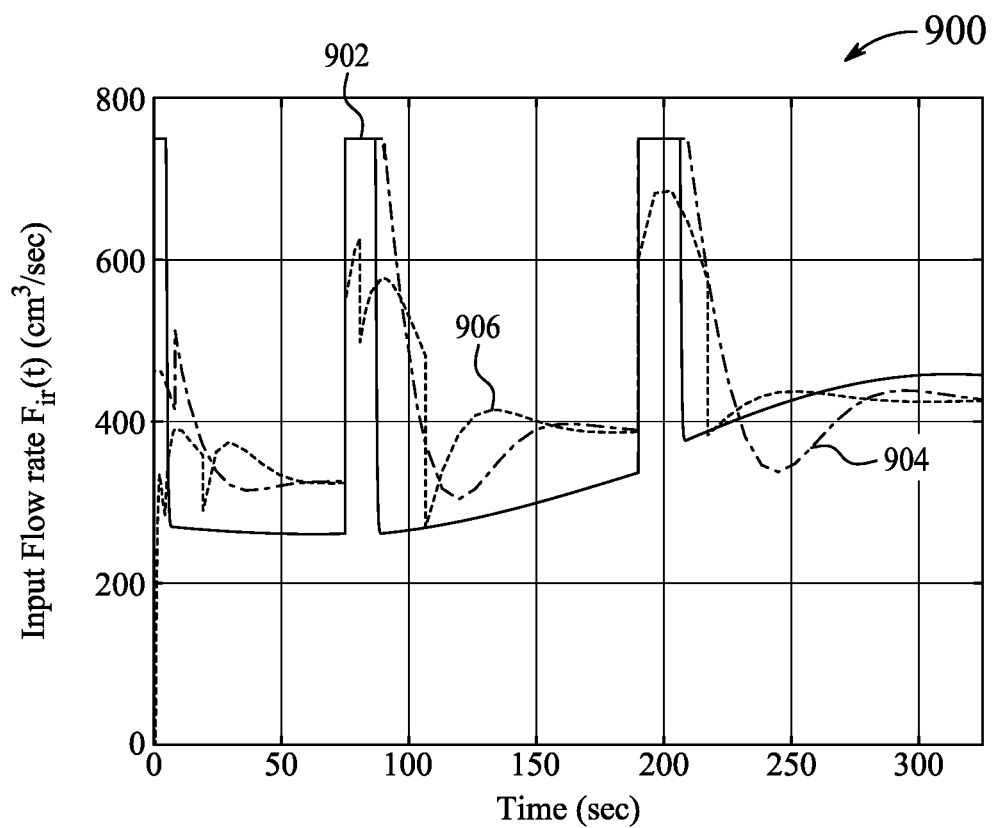
FIG. 9 is a plot illustrating an input flow rate which is a control input for the TDC-IMC control method in comparison to the conventional control methodologies, according to certain embodiments.

FIG. 9 is a plot 900 illustrating an input flow rate which is the control input for the TDC-IMC control method in comparison to the conventional control methodologies, according to aspects of the present disclosure. In FIG. 9, plot line 902 illustrates a control action on the input flow rate for the proposed TDC-IMC control method, plot line 904 illustrates a control action on the input flow rate for the conventional IMC control method, and plot line 906 illustrates a control action on the input flow rate for the conventional IMC-SPW control method. As described in FIG. 9, the control action for the TDC-IMC control method is considerably smoother in comparison to the conventional control methodologies. According to aspects of the present disclosure, the proposed TDC-IMC control method assists in significantly reducing the overshoot that exists in case of the conventional control methodologies. Further, the settling time may also reduce after each update in the set point.

According to aspects of the present disclosure, performance metrics considered for the performance comparison of the proposed TDC-IMC control method are:

A) Integral absolute error (IAE) which is given as $$\int_0^{t_f} |e(t)|dt,$$

where e is the error term defined as the difference between the set point and the output obtained.

B) Integral square error (ISE) obtained by integrating the system error squared over time as $$\int_0^{t_f} e^2(t)dt.$$

C) Integral time absolute error (ITAE) which is given by $$\int_0^{t_f} t|e(t)|dt.$$

D) Integral time square error (ITSE) which is given as $$\int_0^{t_f} te^2(t)dt.$$

E) Energy Index (EI) which is defined as $$\int_0^{t_f} F_{ir}^2(t)dt.$$

In an aspect, all the performance metric values for the proposed TDC-IMC control method are taken to be 100% and the reduction or increase in percentage is reported for the IMC control method and the IMC-SPW control method. Table 3 summarizes the performances of the proposed TDC-IMC control method, the IMC control method, and the IMC-SPW control method.

TABLE 3

Performance metrics for the control methodologies

|  | IMC | IMC-SPW | TDC-IMC |
| --- | --- | --- | --- |
| IAE | 161.85% | 168.91% | 100% |
| ISE | 145.01% | 170.13% | 100% |
| ITAE | 165.11% | 156.13% | 100% |
| ITSE | 142.14% | 149.36% | 100% |
| Energy Index | 118.23% | 111.53% | 100% |

It is evident from Table 3 that the proposed TDC-IMC control method is capable of reducing the error metrics to a greater extent when compared with the IMC control method and the IMC-SPW control method.

Further, the TDC-IMC control method also minimizes the energy consumption which further enhances the efficiency of the conical tank system 100. Accordingly, the proposed TDC-IMC control method provides robustness against external disturbances and uncertainties while demonstrating efficient set point tracking capabilities. Also, the proposed TDC-IMC control method does not require the absolute knowledge of the conical tank system 100 as it only utilizes the input-output data of the previous time instant for estimating the unknown part of the dynamics of the conical tank system 100. In an example, the proposed TDC-IMC control method does not require to have knowledge about the upper bounds of uncertainties.

According to aspects of the present disclosure, with a time-delayed loop used for estimating the non-linearity through input-output data from the previous time instant, the proposed TDC-IMC control method has been utilized for liquid level control in the conical tank system 100, which is inherently non-linear in nature. Further, a control law generated using TDC method and controller gains tuned using IMC method makes the set point tracking controller, $G_{Cn}(s)$, easily implementable for practical systems.

Figure 10:
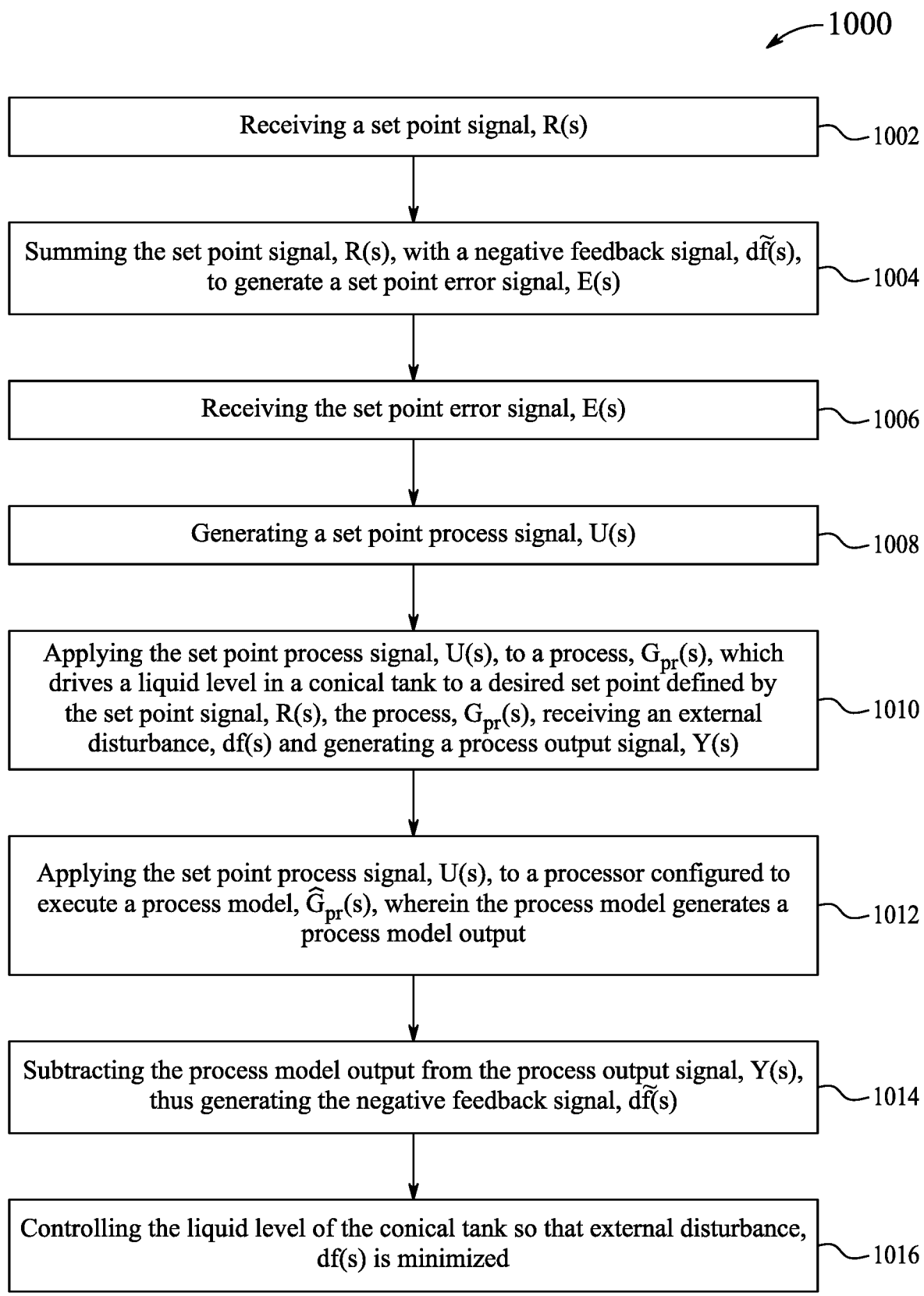
FIG. 10 is a flowchart of a liquid level control method for set point control of a liquid level in a conical tank, according to certain embodiments.

FIG. 10 is a flowchart of a liquid level control method 1000 for set point control of a liquid level in the conical tank 102, according to aspects of the present disclosure. The liquid level control method 1000 is referred to as method 1000 hereinafter.

At step 1002, the method 1000 includes receiving a set point signal, R(s).

At step 1004, the method 1000 includes summing the set point signal, R(s), with a negative feedback signal, df̃(s), to generate a set point error signal, E(s).

At step 1004, the method 1000 includes receiving the set point error signal, E(s). According to an aspect, a set point tracking controller, $G_{Cn}(s)$, may be configured to receive the set point error signal, E(s).

At step 1006, the method 1000 includes generating a set point process signal, U(s). According to an aspect, the set point tracking controller, $G_{Cn}(s)$, may be configured to generate the set point process signal, U(s).

At step 1008, the method 1000 includes applying the set point process signal, U(s), to a process, $G_{pr}(s)$, which drives the liquid level in the conical tank 102 to a desired set point defined by the set point signal, R(s). The process, $G_{pr}(s)$, receives an external disturbance, df(s), and generates a process output signal, Y(s). According to an aspect, the process, $G_{pr}(s)$, drives the liquid level in the conical tank 102 to the set point such that a change in height of the liquid per unit time, dh/dt, is given by the equation (6).

At step 1010, the method 1000 includes applying the set point process signal, U(s), to a processor configured to execute a process model, $\hat{G}_{pr}(s)$. The process model, $\hat{G}_{pr}(s)$, generates a process model output.

At step 1012, the method 1000 includes subtracting the process model output from the process output signal, Y(s), thus generating the negative feedback signal, df̃(s).

At step 1014, the method 1000 includes controlling the liquid level of the conical tank 102 so that external disturbance, df(s), is minimized. According to an aspect, the set point tracking controller, $G_{Cn}(s)$, controls the liquid level of the conical tank 102. In an aspect, the processor executing a set of program instructions of the set point tracking controller, $G_{Cn}(s)$, may program a liquid level set point control based on an artificial time delay using internal model control (IMC) feedback.

The first embodiment is illustrated with respect to FIGS. 1-10. The first embodiment describes a liquid level control method for set point control of a liquid level in a conical tank 102. The liquid level control method for set point control of the liquid level in the conical tank 102 includes receiving a set point signal, R(s), summing the set point signal with a negative feedback signal, df̃(s), to generate a set point error signal, E(s), receiving, by a set point tracking controller, $G_{Cn}(s)$, 402 the set point error signal, E(s), generating, by the set point tracking controller, $G_{Cn}(s)$, 402 a set point process signal, U(s), applying the set point process signal, U(s), to a process, $G_{pr}(s)$, 404 which drives the liquid level in the conical tank 102 to a desired set point defined by the set point signal, R(s), the process, $G_{pr}(s)$, 404 receiving an external disturbance, df(s) and generating a process output signal, Y(s), applying the set point process signal, U(s), to a processor configured to execute a process model, $\hat{G}_{pr}(s)$, 406 wherein the process model 406 generates a process model output, subtracting the process model output from the process output signal, Y(s), thus generating the negative feedback signal, df̃(s), and controlling the liquid level of the conical tank 102 so that external disturbance, df(s) 606 is minimized.

The liquid level control method further includes performing, by the processor executing a set of program instructions of the set point tracking controller, $G_{Cn}(s)$, 402 liquid level set point control based on an artificial time delay using internal model control (IMC) feedback.

The liquid level control method further includes designing a transfer function of the set point tracking controller 402 to approximate the inverse of the process.

The liquid level control method further includes factorizing, by the processor, the process model, $\hat{G}_{pr}(s)$, 406 into an invertible part, $G_{pr}^{+}(s)$ and a non-invertible part, $G_{pr}^{-}(s)$, and generating the process model output based on the invertible, $G_{pr}^{+}(s)$ part.

The liquid level control method further includes low pass filtering the set point error signal, E(s), by a low pass filter, $G_f(s)$, and such that a transfer function of the set point tracking controller 402 is given by:

$$G_{Cn}(s) = \hat{G}_{pr}^{+}(s)^{-1} G_f(s)$$

The low pass filter, $G_f(s)$ is a first order low pass filter given by:

$$G_f(s) = \frac{1}{1 + T_f s},$$

where $T_f(s)$ is a filter time constant.

The liquid level control method further includes setting the filter time constant, Tf(s) equal to a time constant of an open loop defined by the set point tracking controller, $G_{Cn}(s)$ 402 and the process, $G_{pr}(s)$ 404.

The liquid level control method further includes computing a transfer function of the set point tracking controller, $G_{Cn}(s)$, 402 combined with the processor configured to execute the process model, $\hat{G}_{pr}(s)$, 406 based on:

$$G_{IMC-PID}(s) = \frac{G_{pr}^{+}(s)^{-1} G_f(s)}{1 - G_{pr}^{+}(s)^{-1} G_f(s) \hat{G}_{pr}(s)}$$

The liquid level control method further includes calculating the set point process signal, U(s), based on $$U(s) = \frac{(R(s) - df(s)) G_{Cn}(s)}{1 + (G_{pr}(s) - \hat{G}_{pr}(s)) G_{Cn}(s)}$$

where $\hat{G}_{pr}(s)$ represents a vector of the process, $G_{pr}(s)$ 404.

The liquid level control method further includes calculating the process output signal, Y(s), based on:

$$Y(s) = \frac{G_{Cn}(s) G_{pr}(s) R(s) + (1 - G_{Cn}(s) \hat{G}_{pr}(s)) df(s)}{1 + (G_{pr}(s) - \hat{G}_{pr}(s)) G_{Cn}(s)}.$$

The liquid level control method further includes driving the liquid level in the conical tank 102 to the set point such that a change in height of the liquid per unit time, dh/dt, is given by:

$$\frac{dh}{dt} = \frac{F_{ir} - K\sqrt{h}}{A},$$

where h is a height of the liquid level at the set point, A is a cross sectional area of the conical tank 102 at the set point, $F_{ir}$ is an inflow rate of the liquid into the conical tank 102 and K is a valve coefficient of a valve which controls the inflow rate, $F_{ir}$.

The second embodiment is illustrated with respect to FIGS. 1-11. The second embodiment describes a system for liquid level set point control. The system includes a conical tank 102 having an open end area $A=\pi R^2$, where R is a radius of the open end at an open end height, H, defined by a length from a point of a cone to the open end, wherein a liquid level set point signal, R(s), defines a set point height, h, of a liquid in the conical tank 102 at a radius, r, and a set point area, $a=\pi r^2$, a valve, K, configured to control an inflow rate, $F_{ir}$, of liquid into the conical tank 102, a process, $G_{pr}(s)$, 404 connected to the valve, K, the process $G_{pr}(s)$ 404 configured to control the valve, K, to drive the liquid level in the conical tank 102 to the set point height, h, and generate a process output signal, Y(s), an external disturbance, df(s), 606 input to the process, $G_{pr}(s)$, 404 a processor configured to execute a process model, $\hat{G}_{pr}(s)$ 406 to generate a negative feedback signal, df̂(s), a set point tracking controller, $G_{Cn}(s)$, 402 including circuitry and program instructions, which when executed by the processor, receive the set point signal, R(s), the process output signal, Y(s), and the negative feedback signal df̂(s), and generate a set point process signal, U(s), a feedback loop configured to connect the processor to receive the set point process signal, U(s), and provide the negative feedback signal, df̂(s), to the set point tracking controller, $G_{Cn}(s)$ 402 and wherein the set point tracking controller, $G_{Cn}(s)$, 402 is configured to control the liquid level of the conical tank 102 so that external disturbance, df(s) 606 is minimized.

The system further includes an amplifier, $B^{-1}(t)$, connected to an output of the set point tracking controller 402, the amplifier configured to adjust a gain of the set point process signal, U(s), and an artificial time delay loop connected between the amplifier, $B^{-1}(t)$, and the process, $G_{pr}(s)$, 402 the artificial time delay loop configured to delay an input of the set point process signal, U(s) to the process, $G_{pr}(s)$, 402 until an uncertainty due to the external disturbance, df(s), 606 has settled.

A gain of the amplifier, $B^{-1}(t)$, is given by:

$$B^{-1}(t)=\pi R^2/H^2 h(t)^{-2}.$$

The processor is further configured to factorize the process model, $\hat{G}_{pr}(s)$, 406 into an invertible part, $G_{pr}^{+}(s)$ and a non-invertible part, $G_{pr}^{-}(s)$, and generate the process model output based on the invertible, $G_{pr}^{+}(s)$ part.

The system further includes a low pass filter, $G_f(s)$, connected to the set point tracking controller, $G_{Cn}(s)$, 402 the low pass filter configured to filter the set point error signal, E(s), such that a transfer function of the set point tracking controller 402, is given by:

$$G_{Cn}(s)=\hat{G}_{pr}^{+}(s)^{-1}G_f(s).$$

The low pass filter, $G_f(s)$ is a first order low pass filter given by:

$$G_f(s) = \frac{1}{1+T_f s},$$

where $T_f(s)$ is a filter time constant equal to a time constant of an open loop defined by the set point tracking controller, $G_{Cn}(s)$ 402 and the process, $G_{pr}(s)$ 404.

The set point tracking controller, $G_{Cn}(s)$, 402 when integrated with the processor, is an internal model control-proportional integral derivative (IMC-PID) controller having a transfer function given by:

$$G_{IMC-PID}(s) = \frac{G_{pr}^{+}(s)^{-1}G_f(s)}{1-G_{pr}^{+}(s)^{-1}G_f(s)\hat{G}_{pr}(s)}.$$

The set point tracking controller, $G_{Cn}(s)$, 402 is configured to calculate the set point process signal, U(s), based on $$U(s) = \frac{(R(s)-d\hat{f}(s))G_{Cn}(s)}{1+(G_{pr}(s)-\hat{G}_{pr}(s))G_{Cn}(s)};$$

and calculate the process output signal, Y(s), based on:

$$Y(s) = \frac{G_{Cn}(s)G_{pr}(s)R(s)+\left(1-G_{Cn}(s)\hat{G}_{pr}(s)\right)df(s)}{1+(G_{pr}(s)-\hat{G}_{pr}(s))G_{Cn}(s)},$$

where $\hat{G}_{pr}(s)$ represents a vector of the process, $G_{pr}(s)$ 404.

The third embodiment is illustrated with respect to FIGS. 1-10. The third embodiment describes a non-transitory computer readable medium having program instructions stored therein that, when executed by one or more processors, cause the one or more processors to perform a liquid level control method for set point control of a liquid level in a conical tank 102, comprising receiving a set point signal, R(s), summing the set point signal with a negative feedback signal, df̂(s), to generate a set point error signal, E(s), receiving, by a set point tracking controller, $G_{Cn}(s)$, 402 the set point error signal, E(s), generating, by the set point tracking controller, $G_{Cn}(s)$, 402 a set point process signal, U(s), applying the set point process signal, U(s), to a process, $G_{pr}(s)$, 404 which drives the liquid level in the conical tank 102 to a desired set point defined by the set point signal, R(s), the process, $G_{pr}(s)$, 404 receiving an external disturbance, df(s) 606 and generating a process output signal, Y(s), applying the set point process signal, U(s), to a processor configured to execute a process model, $\hat{G}_{pr}(s)$, 406 wherein the process model 406 generates a process model output, subtracting the process model output from the process output signal, Y(s), thus generating the negative feedback signal, df̂(s), and controlling the liquid level of the conical tank 102 so that external disturbance, df(s) 602 is minimized.

Figure 11:
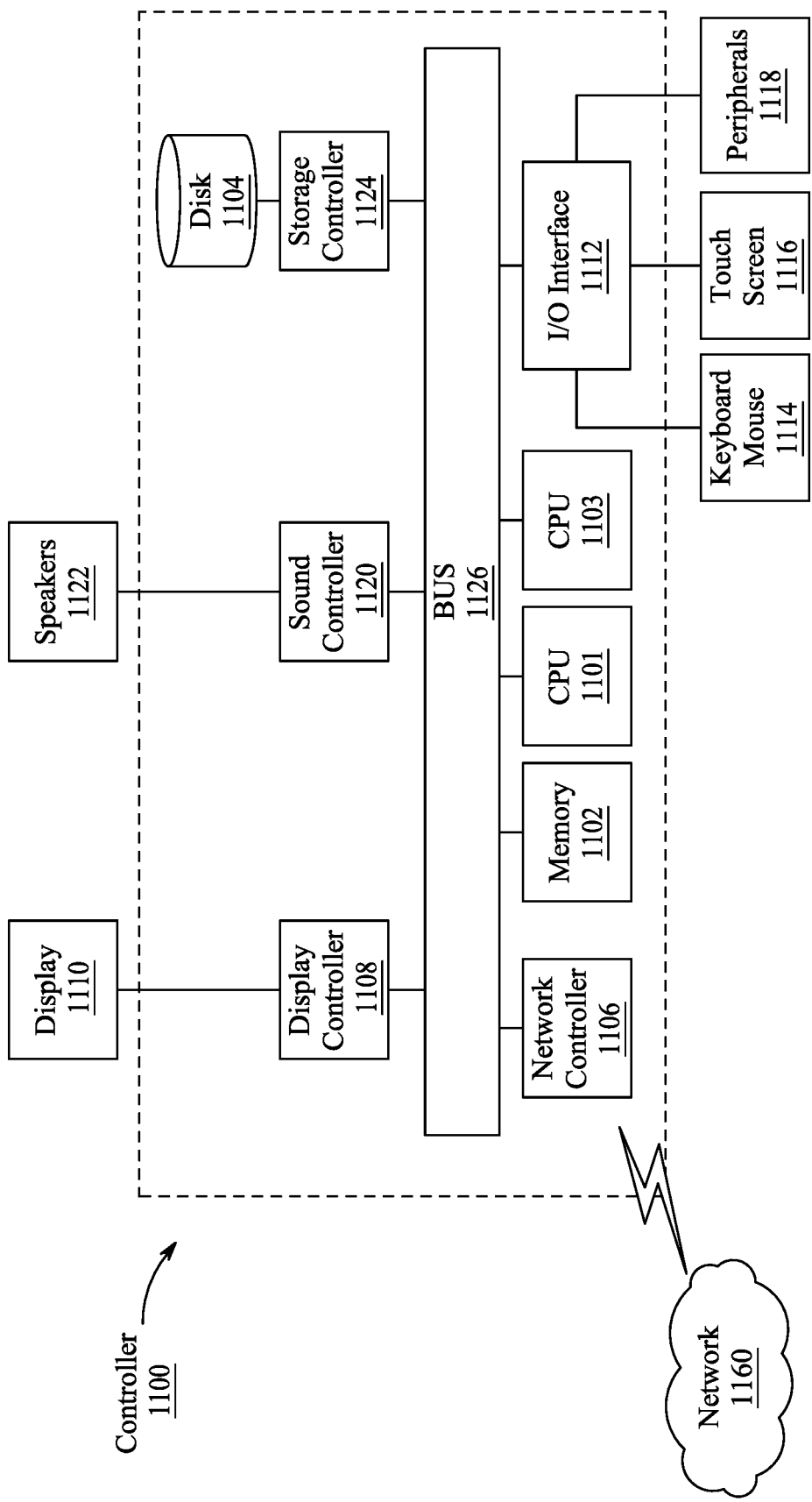
FIG. 11 is an illustration of a non-limiting example of details of computing hardware used in the controller, according to certain embodiments.

Next, further details of the hardware description of the computing environment according to exemplary embodiments is described with reference to FIG. 11. FIG. 11 is an illustration of a non-limiting example of details of computing hardware used in the computing system, according to exemplary aspects of the present disclosure. In FIG. 11, a controller 1100 is described which is a computing device (for example, the set point tracking controller, $G_{Cn}(s)$, 402) and includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1101, 1103 and an operating system such as Microsoft Windows 7, UNIX, Solaris, LINUX, Apple MAC-OS, and other systems known to those skilled in the art.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of ordinary skill in the art would recognize. Further, CPU 1101, 1103 may be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general-purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
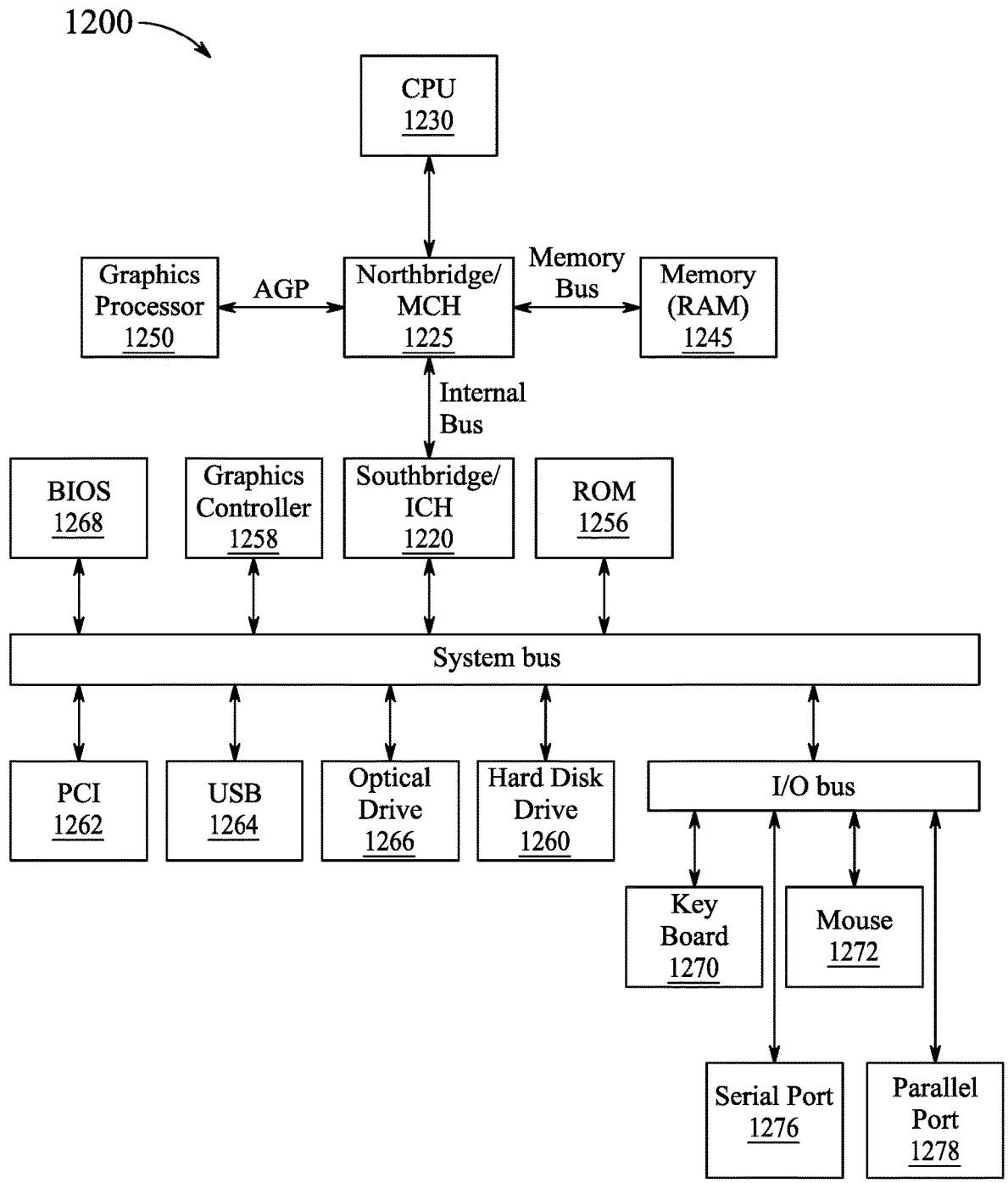
FIG. 12 is an exemplary schematic diagram of a data processing system used within the controller, according to certain embodiments.

FIG. 12 shows a schematic diagram of a data processing system 1200 used within the computing system, according to exemplary aspects of the present disclosure. The data processing system 1200 is an example of a computer in which code or instructions implementing the processes of the illustrative aspects of the present disclosure may be located.

In FIG. 12, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Figure 13:
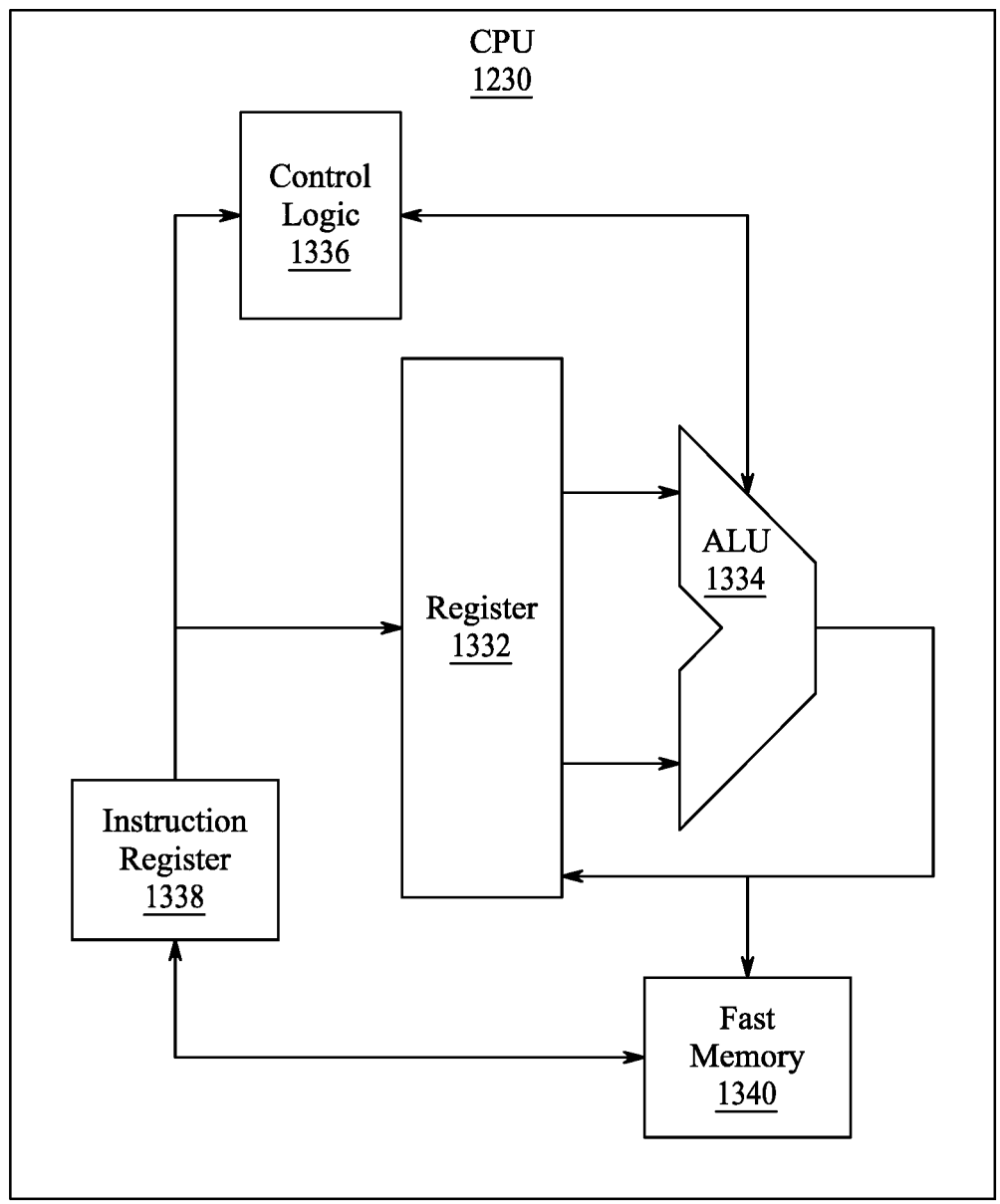
FIG. 13 is an exemplary schematic diagram of a processor used with the controller, according to certain embodiments.

For example, FIG. 13 shows one aspects of the present disclosure of CPU 1230. In one aspects of the present disclosure, the instruction register 1338 retrieves instructions from the fast memory 1340. At least part of these instructions is fetched from the instruction register 1338 by the control logic 1336 and interpreted according to the instruction set architecture of the CPU 1230. Part of the instructions can also be directed to the register 1332. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain aspects of the present disclosures, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1200 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices may include, for example, Ethernet adapters, add-in cards, and PC cards for notebook computers. The Hard disk drive 1260 and CD-ROM 1256 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1260 and optical drive 1266 can also be coupled to the SB/ICH 1220 through a system bus. In one aspects of the present disclosure, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 14:
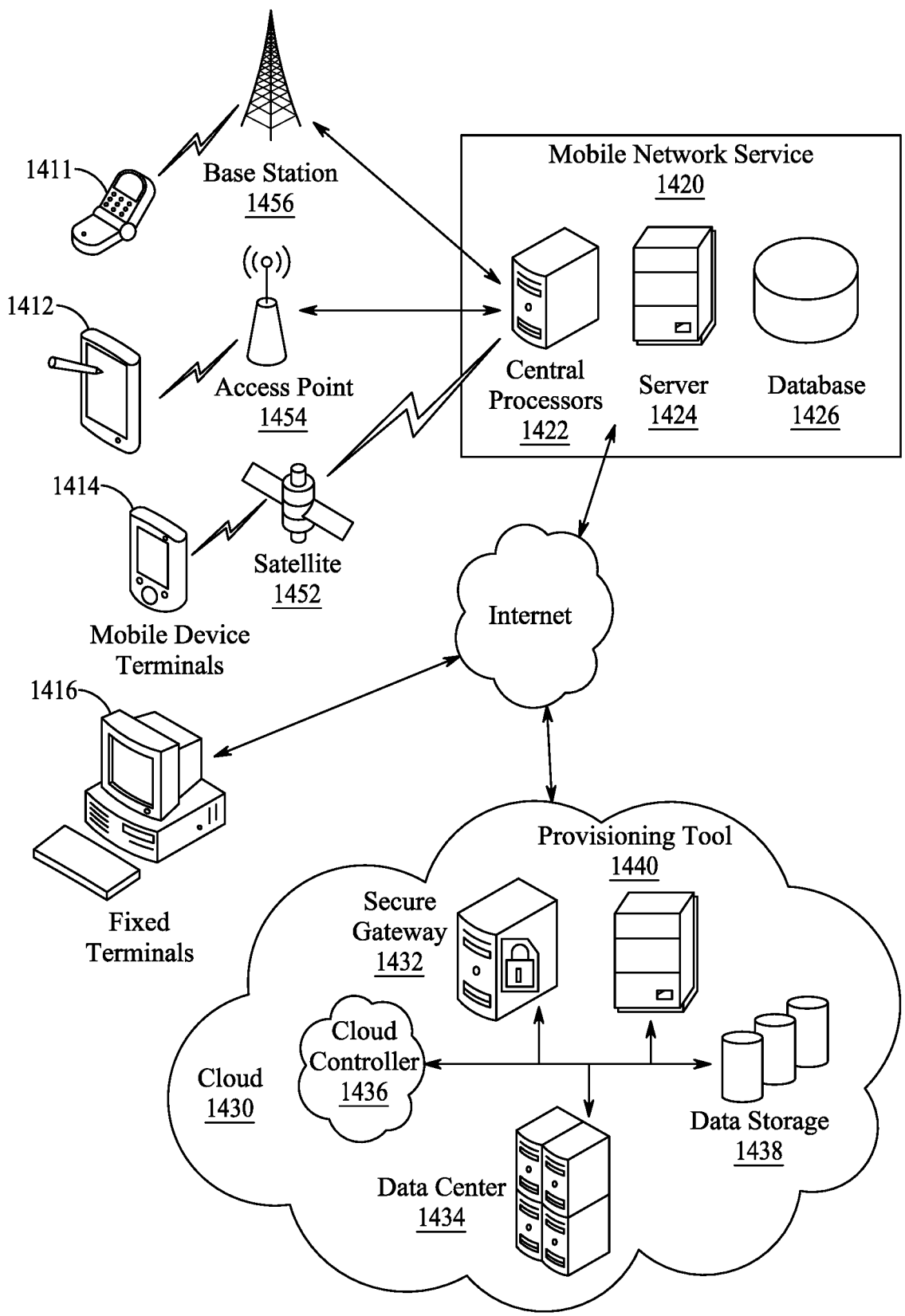
FIG. 14 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A system for liquid level set point control, comprising:
a conical tank having an open end area A=πR2, where R is a radius of the open end at an open end height, H, defined by a length from a point of a cone to the open end, wherein a liquid level set point signal, R(s), defines a set point height, h, of a liquid in the conical tank at a radius, r, and a set point area, a=πr2;
a valve, K, configured to control an inflow rate, Fir, of liquid into the conical tank;
a process, Gpr(s), connected to the valve, K, the process Gpr(s) configured to control the valve, K, to drive the liquid level in the conical tank to the set point height, h, and generate a process output signal, Y(s);
an external disturbance, df(s), input to the process, Gpr(s);
a processor configured to execute a process model, $\hat{G}$pr(s) to generate a negative feedback signal, $\tilde{df}$(s);
a set point tracking controller, $G_{Cn}(s)$, including circuitry and program instructions, which when executed by the processor, receive the set point signal, R(s), the process output signal, Y(s), and the negative feedback signal $\tilde{df}$(s), and generate a set point process signal, U(s);
a feedback loop configured to connect the processor to receive the set point process signal, U(s), and provide the negative feedback signal, $\tilde{df}$(s), to the set point tracking controller, $G_{Cn}(s)$ and
wherein the set point tracking controller, $G_{Cn}(s)$, is configured to control the liquid level of the conical tank so that external disturbance, df(s) is minimized, and
an amplifier, $B^{-1}(t)$, connected to an output of the set point tracking controller, the amplifier configured to adjust a gain of the set point process signal, U(s); and
an artificial time delay loop connected between the amplifier, $B^{-1}(t)$, and the process, $G_{pr}(s)$, the artificial time delay loop configured to delay an input of the set point process signal, U(s) to the process, $G_{pr}(s)$, until an uncertainty due to the external disturbance, df(s), has settled.

2. The system of claim 1, wherein a gain of the amplifier, $B^{-1}(t)$, is given by:

$$B^{-1}(t)=\pi R^2/H^2 h(t)^{-2}.$$

3. The system of claim 1, wherein the processor is further configured to:
factorize the process model, $\hat{G}_{pr}(s)$, into an invertible part, $G_{pr}^{+}(s)$ and a non-invertible part, $G_{pr}^{-}(s)$; and
generate the process model output based on the invertible, $G_{pr}^{+}(s)$ part.

4. The system of claim 3, further comprising:
a low pass filter, $G_f(s)$, connected to the set point tracking controller, $G_{Cn}(s)$, the low pass filter configured to filter the set point error signal, E(s), such that a transfer function of the set point tracking controller, is given by:

$$G_{Cn}(s)=\hat{G}_{pr}^{+}(s)^{-1}G_f(s).$$

5. The system of claim 4, wherein the low pass filter, $G_f(s)$ is a first order low pass filter given by:

$$G_f(s) = \frac{1}{1+T_f s},$$

where $T_f(s)$ is a filter time constant equal to a time constant of an open loop defined by the set point tracking controller, $G_{Cn}(s)$ and the process, $G_{pr}(s)$.

6. The system of claim 5, wherein the set point tracking controller, $G_{Cn}(s)$, when integrated with the processor, is an internal model control-proportional integral derivative (IMC-PID) controller having a transfer function given by:

$$G_{IMC-PID}(s) = \frac{G_{pr}^{+}(s)^{-1}G_f(s)}{1-G_{pr}^{+}(s)^{-1}G_f(s)\hat{G}_{pr}(s)}.$$

7. The system of claim 1, wherein the set point tracking controller, $G_{Cn}(s)$, is configured to:

calculate the set point process signal, U(s), based on $$U(s) = \frac{(R(s) - df(s))G_{Cn}(s)}{1 + (G_{pr}(s) - \hat{G}_{pr}(s))G_{Cn}(s)};$$

and calculate the process output signal, Y(s), based on:

$$Y(s) = \frac{G_{Cn}(s)G_{pr}(s)R(s) + (1 - G_{Cn}(s)\hat{G}_{pr}(s))df(s)}{1 + (G_{pr}(s) - \hat{G}_{pr}(s))G_{Cn}(s)},$$

where $\hat{G}_{pr}(s)$ represents a vector of the process, $G_{pr}(s)$.

* * * * *